United States Patent
Nakajima et al.

[15] 3,645,180
[45] Feb. 29, 1972

[54] PHOTOGRAPHIC PRINTING APPARATUS

[72] Inventors: Tohru Nakajima; Susumu Tashiro, both of Tokyo; Kenmi Tsukatani, Mitaka-shi; Koichi Mori, Tokyo, all of Japan

[73] Assignees: Asahi Optical Company, Ltd., Tokyo; Fujitsu Limited, Kawasaki, Japan

[22] Filed: Dec. 27, 1968

[21] Appl. No.: 787,507

[30] Foreign Application Priority Data

Dec. 28, 1967 Japan.................................42/85044
Dec. 28, 1967 Japan.................................42/85045

[52] U.S. Cl...................................................95/4.5
[51] Int. Cl..............................................B41b 17/10
[58] Field of Search...........................................95/4.5

[56] References Cited

UNITED STATES PATENTS

| | | | |
|---|---|---|---|
| 2,670,665 | 3/1954 | Caldwell | 95/4.5 |
| 2,781,706 | 2/1957 | Higonnet | 95/4.5 |
| 1,893,439 | 1/1933 | Ogden | 95/4.5 |
| 2,469,423 | 5/1949 | Wise | 95/4.5 UX |
| 2,515,862 | 7/1950 | Carlton | 95/4.5 UX |
| 2,639,751 | 5/1953 | Flaherty | 292/251.5 UX |
| 2,787,200 | 4/1957 | Kwei | 95/4.5 |
| 2,961,920 | 11/1960 | Sachtleben | 95/4.5 X |
| 3,228,313 | 1/1966 | Higonnet | 95/4.5 |
| 3,252,392 | 5/1966 | Ward | 95/4.5 |

FOREIGN PATENTS OR APPLICATIONS

| | | | |
|---|---|---|---|
| 799,460 | 4/1936 | France | 95/4.5 |
| 992,584 | 7/1951 | France | 95/4.5 |

*Primary Examiner*—Samuel S. Matthews
*Assistant Examiner*—Monroe H. Hayes
*Attorney*—Curt M. Avery, Arthur E. Wilfond, Herbert L. Lerner and Daniel J. Tick

[57] ABSTRACT

A lens system interposed between the character sheet and the photosensitive sheet directs images of selected ones of the characters on the character sheet to the photosensitive sheet. The lens system comprises a plurality of objective lenses and a camera lens having optical axes parallel to each other and perpendicular to the character sheet. The objective lenses have focal points on the character sheet and the camera lens has a focal point on the photosensitive sheet and intercepts all parallel light quanta transmitted by the objective lenses.

3 Claims, 18 Drawing Figures

PHOTOGRAPHIC PRINTING APPARATUS

DESCRIPTION OF THE INVENTION

The present invention relates to photographic printing apparatus. More particularly, the invention relates to a lens system for photographic printing apparatus. In photographic printing apparatus of the present invention, a character sheet, which is a photographic negative, is interposed between and irradiated by a source of light and a photosensitive sheet or plate. The character sheet is mounted on a continuously rotating drum or disc and characters from the character sheet are printed on the photosensitive plate.

In a known lens or optical system for photographic printing apparatus, wherein an illuminated character on a character sheet is a photographic negative and an image of such character is formed on the photosensitive plate, light beams, quanta or flux from the selected character do not always reach the optical axis of the camera lens. This is due to the fact that a number of characters are provided on the character sheet, which character sheet is mounted on a continuously rotating disc or drum. It has been attempted to solve this problem by directing the light quanta to the optical axis by combining a number of reflectors or by moving the camera lens. The reflectors may be combined so that they are stationary or movable. When the reflectors are stationary, the number of such reflectors is increased in accordance with the number of characters. Since the light quanta are reflected and transmitted repeatedly, a great number of times, the quantity or intensity of light is rapidly decreased and considerable distortion of the image provided by the reflectors ensues. When the reflectors are combined in a movable manner, the number of movable reflectors increases as the characters on the character sheet increase. It is therefore necessary to move the reflectors at high speed, synchronously with the selected characters. Furthermore, the optical relationship between the reflectors and the characters must be maintained, so that the movable reflector system requires complicated and complex mechanisms in order to maintain stable optical relations. The image of the character thus inevitably has a low resolving power and the speed of operation in printing such image is limited to a determined level.

The principal object of the present invention is to provide a new and improved lens system for photographic printing apparatus.

An object of the present invention is to provide new and improved photographic printing apparatus.

An object of the present invention is to provide a lens system for photographic printing apparatus, which lens system overcomes the disadvantages of known systems.

An object of the present invention is to provide a lens system for photographic printing apparatus, which lens system permits high-speed operation of such apparatus.

An object of the present invention is to provide high-speed photographic printing apparatus.

An object of the present invention is to provide photographic printing apparatus in which the number of characters may be readily increased with stability.

An object of the present invention is to provide photographic printing apparatus in which the characters may be modified with stability and facility.

An object of the present invention is to provide a lens system of simple structure for photographic printing apparatus, which lens system provides very high resolving power.

An object of the present invention is to provide photographic printing apparatus which functions with high quality, at high speed, and with efficiency, effectiveness and reliability.

An object of the present invention is to provide photographic printing apparatus wherein the distance between a character and its image may be freely determined.

An object of the present invention is to provide photographic printing apparatus in which the magnification factor in printing of the character may be modified in a completely arbitrary manner.

In accordance with the present invention, photographic printing apparatus includes a photosensitive plate, a source of light, a character sheet interposed between and irradiated by the source of light and the photosensitive plate for printing characters from the character sheet on the photosensitive plate and a lens system. The lens system is interposed between the character sheet and the photosensitive plate for directing images of selected ones of the characters on the character sheet to the photosensitive plate. The lens system comprises a plurality of objective lenses each having an optical axis parallel to that of the others and substantially perpendicular to the character sheet and a focal point on the character sheet. A camera lens is interposed between the objective lenses and the photosensitive plate and is of sufficient dimensions to intercept all parallel light quanta transmitted by the objective lenses. The camera lens has an optical axis parallel to the optical axes of the objective lenses and a focal point on the photosensitive plate so that the camera lens provides on the photosensitive plate an image of a selected one of the characters.

A plurality of character sheets may be interposed between the source of light and the photosensitive means. The mounting means removably mounts each of the character sheets on the inside of the cylindrical surface of the drum over corresponding selected ones of the windows.

The mounting means comprises a first sheet holder holding the character sheet along one edge of the sheet. A second sheet holder holds the character sheet along the opposite edge of the sheet. Each of the sheet holders comprises magnetic material. Magnets are mounted on the inside of the cylindrical surface of the drum in areas corresponding to the positions of the sheet holders. The windows are elongated in directions transverse to the axis of the drum. The drum has a plurality of positioning apertures formed therein at the inside of the cylindrical surface of the drum. Each of the first and second sheet holders of the mounting means includes a positioning pin extending therefrom and adapted to seat in a corresponding one of the positioning apertures. Each of the first and second sheet holders of the mounting means includes a plurality of spacing pins extending therefrom and adapted to space the sheet holders a determined radial distance from the inside of the cylindrical surface of the drum to permit radial movement of the character sheet when the character sheet is mounted on the drum.

The source of light comprises a plurality of lamps positioned in the rotatable body, each aligned with a corresponding one of the objective lenses or a plurality of lamps positioned in each of the rotatable bodies and each of the objective lenses is aligned with a corresponding one of the lamps.

A reflector may be interposed between the objective lenses and the camera lens for directing light quanta transmitted by the objective lenses to the camera lens.

Each of a pair of the rotatable bodies is rotatable at right angles to the other in one embodiment of the invention. Each of a pair of the rotatable bodies is rotatable parallel with the other in another embodiment of the invention. Each of a pair of the rotatable bodies is rotatable coaxially with the other in still another embodiment of the invention.

In order that the present invention may be readily carried into effect, it will now be described with reference to the accompanying drawings, wherein.

In the FIGS., the same components are identified by the same reference numerals.

Figure 1:
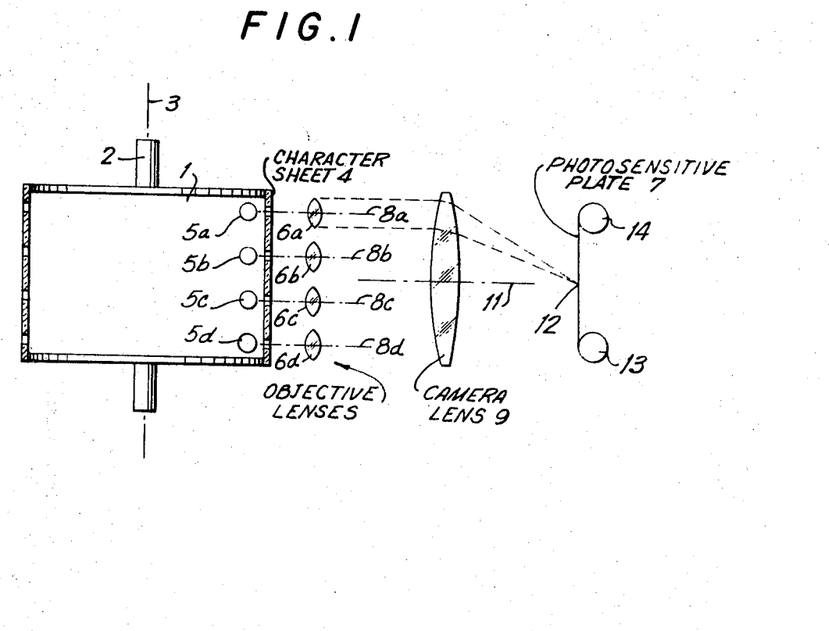
FIG. 1 is a schematic diagram of an embodiment of the lens system of the present invention, including the related components of the photographic printing apparatus.

In FIG. 1, a drum 1 is mounted on a shaft 2 and rotates with said shaft about the axis 3 of said shaft. A character sheet 4 is mounted on the cylindrical surface of the drum and rotates therewith. The plurality of spots on the character sheet 4 represents different characters recorded on said character sheet.

A plurality of lamps 5a, 5b, 5c and 5d constitutes a light source and is positioned inside the drum so that the light produced by said lamps irradiates the character sheet 4. A plurality of objective lenses 6a, 6b, 6c and 6d is provided between the character sheet and a photosensitive sheet or plate 7. The light source functions in a known manner to provide a flash of light each time a selected character of the character sheet 4 appears between a selected one of the lamps 5a to 5d and the corresponding one of the objective lenses 6a to 6d. Thus, the selected one of the lamps 5a to 5d will flash when the selected character appears between said selected lamp and the corresponding one of the objective lenses 6a to 6d.

Each of the objective lenses 6a to 6d has an optical axis parallel to that of the others and perpendicular to the character sheet 4 and a focal point on said character sheet. Thus, the objective lens 6a has an optical axis 8a which is perpendicular to the character sheet 4 and which extends through the center of the lamp 5a. The objective lens 6a has a focal point on the character sheet 4. The objective lens 6b has an optical axis 8b which is perpendicular to the character sheet 4 and which extends through the center of the lamp 5b. The objective lens 6b has a focal point on the character sheet 4. The objective lens 6c has an optical axis 8c which is perpendicular to the character sheet 4 and which extends through the center of the lamp 5c. The objective lens 6c has a focal point on the character sheet 4. The objective lens 6c has an optical axis 8d which is perpendicular to the character sheet 4 and which extends through the center of the lamp 5d. The objective lens 6d has a focal point on the character sheet 4.

A camera lens 9 is positioned between the objective lenses 6a to 6d and the photosensitive plate 7. The camera lens 9 has an optical axis 11 which is parallel to the optical axes 8a to 8d and is perpendicular to the character sheet 4. The camera lens 9 is of sufficient dimensions and is so positioned that it intercepts all parallel light quanta transmitted by the objective lenses 6a to 6d. The camera lens 9 has a focal point 12 on the photosensitive plate 7. Light quanta passing through the camera lens 9 form an image at the focal point 12 of said camera lens on the photosensitive plate 7. The photosensitive plate or sheet 7 may comprise a continuous flexible sheet of photosensitive material which may be supplied from a feed mechanism 13 to a windup mechanism 14.

Figure 2:
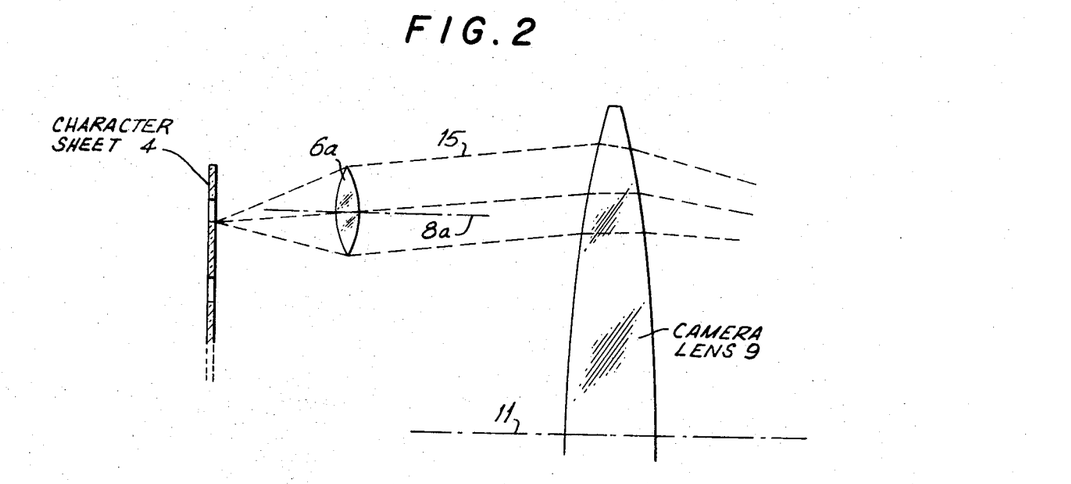
FIG. 2 is a schematic diagram illustrating the operation of the lens system of the present invention.

The photographic printing apparatus functions to provide a print of the image of each selected one of the characters of the character sheet 4 on the photosensitive plate 7. The aberration of the camera lens 9 must be small. Although the aberration of the camera lens 9 must be small, said camera lens must intercept light quanta 15 irradiating the extreme peripheral or circumferential areas of said camera lens, as shown in FIG. 2. This ensures that the quantity or intensity of the light quanta passing through the central or optical axis area of the camera lens 9 is the same as that of the light quanta passing through the peripheral or circumferential areas of said camera lens. The character images may thus be printed on the photosensitive plate 7 (FIG. 1) with equal intensity, concentration or quality.

Figure 3A:
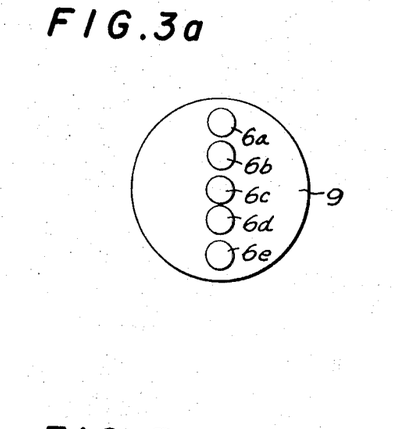
FIGS. 3a, 3b, 3c and 3d are schematic diagrams illustrating different relations between the objective lenses and the camera lens.
Figure 3B:
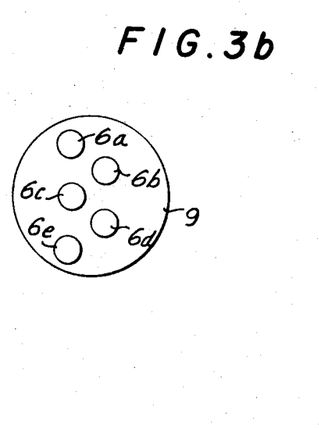
Figure 3C:
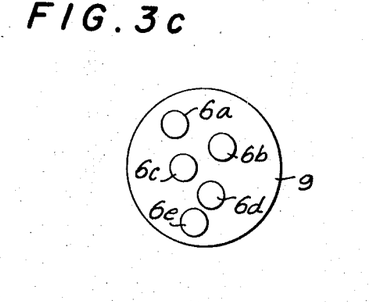
Figure 3D:
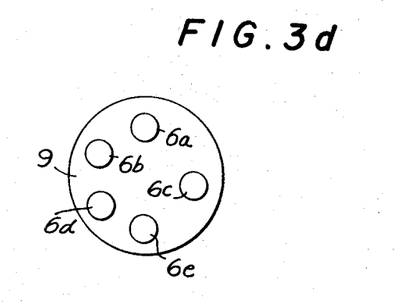

FIGS. 3a, 3b, 3c and 3d illustrate different relations between a plurality of objective lenses 6a, 6b, 6c, 6d and 6e and camera lens 9. The objective lenses 6a to 6e may be arranged in a single line or in two lines, circularly, or in lines which meet each other. The objective lenses 6a to 6e must be positioned so that more than two of said objective lenses are not positioned in a single beam of light passing through a character of the character sheet 4. In FIGS. 3b, 3c and 3d, the surface of the character on the character sheet 4 is not always perpendicular to the optical axis of the objective lens, so that the ratio of the length and width of the printed image of the character is changed to a very slight extent from the character recorded on said character sheet. It is therefore necessary to correct for such small change at the time of the recording of the characters on the character sheet 4.

The slope or inclination of the surface of the character recorded on the character sheet 4 relative to the optical axis of the objective lens must be provided so that it is within the depth of the field of said objective lens. When rotary discs are utilized, as in FIGS. 3b, 3c and 3d, the perpendicular axis of the character recorded on the character sheet 4 must have a slight slope or inclination relative to the radius of the disc in order to correctly position the printed image of the character on the perpendicular axis. These corrections may be provided during the manufacture of the character sheet 4, so that there is no discrepancy in the operation of the photographic printing apparatus and the printed characters on the photosensitive plate 7 are accurately reproduced. Since, in the lens system of the present invention, all the light quanta transmitted by the objective lenses 6a to 6d (FIG. 1) are intercepted by the camera lens 9 (FIG. 1), the distance between said objective lenses and said camera lens may be determined in a completely arbitrary manner and such distance is not influenced by the magnification factor of the printing process.

Figure 4:
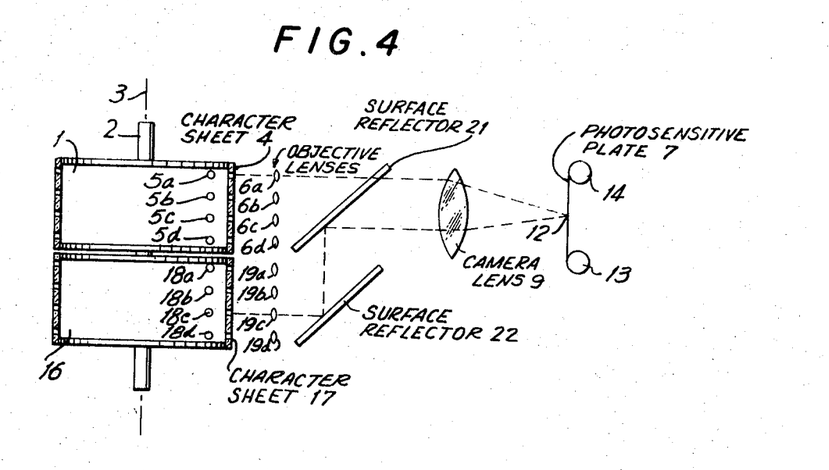
FIG. 4 is a schematic diagram of another embodiment of the lens system of the present invention, including the related components of the photographic printing apparatus.

In the embodiment of FIG. 4, the number of characters may be increased and the form of the characters may be modified. An additional drum 16 is coaxially mounted with the drum 1 on the shaft 2 and both said drums rotate with said shaft about the axis 3 thereof. The drum 1, shaft 2, character sheet 4, lamps 5a to 5d and objective lenses 6a to 6d are the same as in the embodiment of FIG. 1. A system which includes the additional drum 16, an additional character sheet 17, additional lamps 18a to 18d and additional objective lenses 19a to 19d is identical with the first system, as shown in FIG. 1. Thus, the embodiment of FIG. 4 comprises two identical drum and objective lens systems.

The number of characters which may be recorded on the character sheet 4 depends only upon the radius or diameter of the drum 1 and on the size of the characters. Thus, the number of characters may be increased and/or the characters may be modified with considerable facility without necessitating the disruption of operation of the photographic printing apparatus, in the different embodiment of the lens system of the present invention.

In the embodiment of FIG. 4, a pair of surface reflectors 21 and 22 are interposed between the objective lenses 6a to 6d and 19a to 19d, respectively, and the camera lens 9. When a character of the character sheet 4 on the drum 1 is selected, the surface reflector 21 is displaced sideways, so that it does not intercept the light quanta from said character sheet. When a character on the character sheet 17 on the drum 16 is selected, the light quanta from said character sheet 17 is directed to the camera lens 9 by a reflection from the surface reflectors 21 and 22, each of which is positioned at a slope or inclination of 45° with the drums. The difference between the lengths of the optical paths from the surfaces of the drums 1 and 16 to the camera lens 9 does not affect the printing process on the photosensitive plate 7, since the light quanta from the objective lenses 6a to 6d and 19a to 19d, respectively, to said camera lens are parallel to each other.

If the drums 1 and 16 were mounted on parallel shafts, rather than on the same shaft 2, as in the embodiment of FIG. 4, the light quanta from the selected character on the character sheet 4 may not be intercepted by the reflector 21 at the position of use of said reflector. The reflector 21 may thus be fixed in position. Even when the drums 1 and 16 are coaxially mounted, if the objective lenses 16a to 16d and 19a to 19d, respectively, are displaced from each other so that the light quanta from the objective lenses 6a to 6d cannot be intercepted by the reflector 21, and the lamps 5a to 5d and 18a to 18d, respectively, are also displaced from each other, said reflector may still be fixed in position. The embodiment of FIG. 4 permits the number of characters to be nearly doubled.

Figure 5:
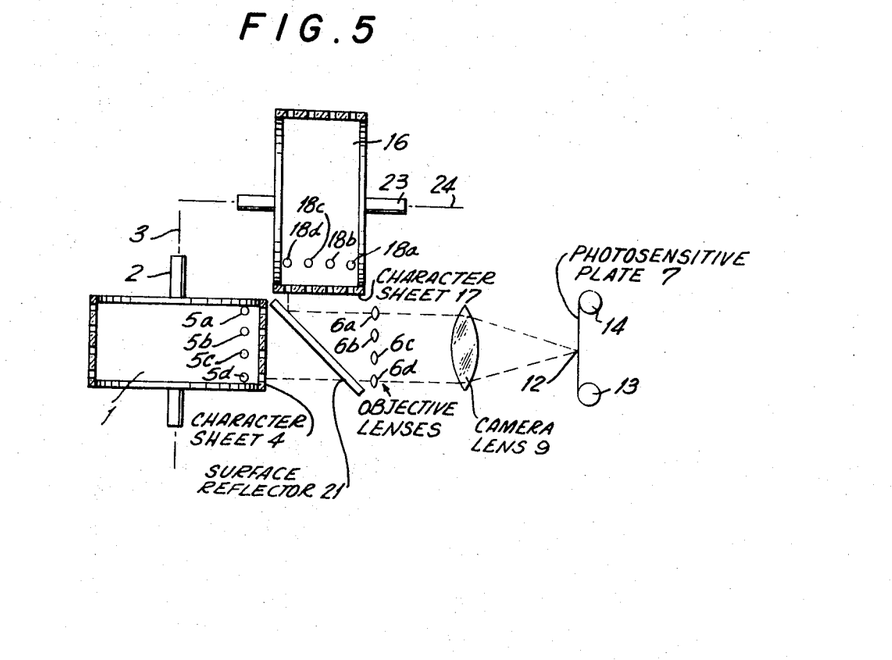
FIG. 5 is a schematic diagram of another embodiment of the lens system of the present invention, including the related components of the photographic printing apparatus.

In the embodiment of FIG. 5, the drums 1 and 16 of the embodiment of FIG. 4 are positioned at right angles to each other. Thus, the additional drum 16 is affixed to and rotates with a shaft 23 about the axis 24 of said shaft. The shafts 2 and 23 may be positioned either coplanarly or in parallel planes. The surface reflector 21 may be either movable or stationary in position, as in the embodiment of FIG. 4. In the embodiment of FIG. 5, the reflector 21 is positioned at a slope or inclination of 45° with each of the character sheets 4 and 17. The objective lenses 6a to 6d of the first system are the only objective lenses utilized in the embodiment of FIG. 5.

Figure 6:
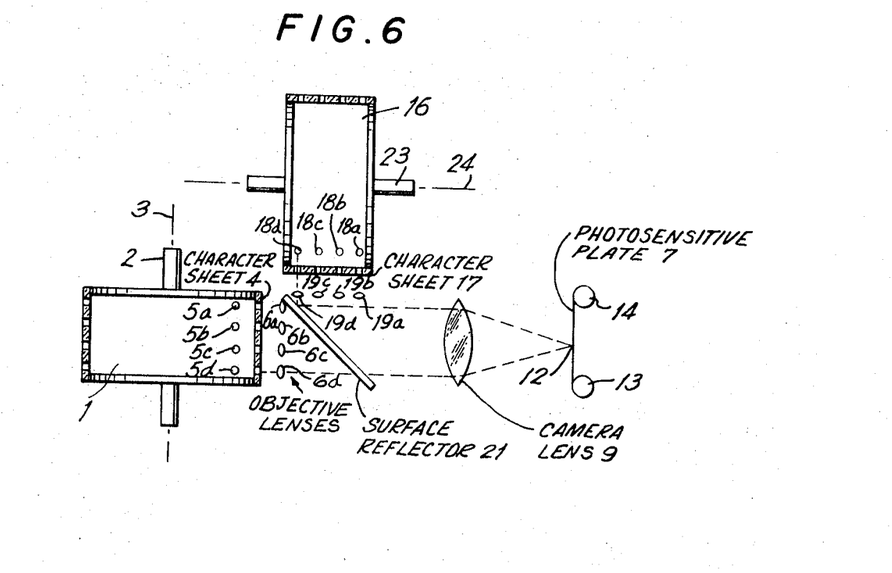
FIG. 6 is a schematic diagram of another embodiment of the lens system of the present invention, including the related components of the photographic printing apparatus.

The embodiment of FIG. 6 is identical with the embodiment of FIG. 5, with the exception that in FIG. 6, the objective lenses 19a to 19d of the additional system are included. The objective lenses 19a to 19d are utilized in the embodiment of FIG. 6, due to the limitation in the magnification factor of the printing process.

Figure 7:
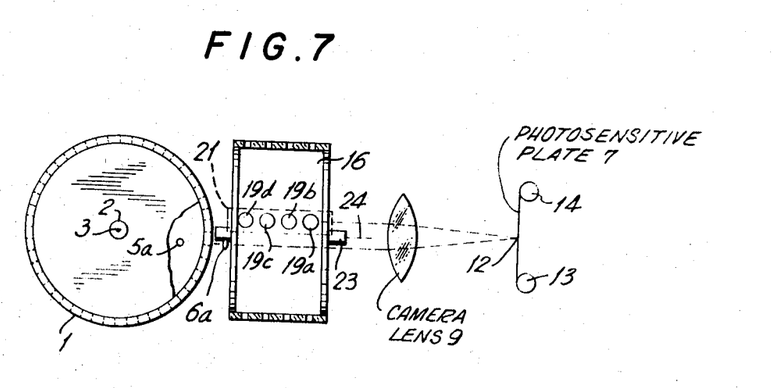
FIG. 7 is another view of the schematic diagram of FIG. 6.

FIG. 7 is another view of the embodiment of FIG. 6. In the view of FIG. 7, the shafts 2 and 23 of the drums 1 and 16, respectively, are seen to be coplanarly positioned and the surface reflector 21 is fixed in position.

Figure 8:
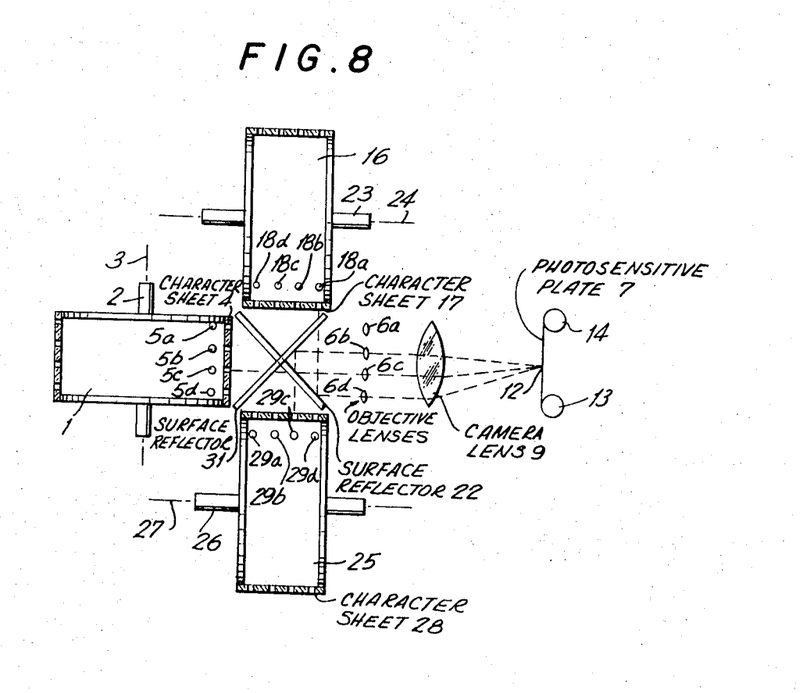
FIG. 8 is a schematic diagram of another embodiment of the lens system of the present invention, including the related components of the photographic printing apparatus.

The embodiment of FIG. 8 is similar to the embodiment of FIG. 5 with the exception that a third drum 25 is affixed to and rotates with a third shaft 26 about the axis 27 of said third shaft. A third character sheet 28 is mounted on the third drum 25. A plurality of lamps 29a, 29b, 29c and 29d are positioned inside the third drum 25 in the same manner as the lamps of the first and second drums. An additional surface reflector 31 is positioned at right angles to the surface reflector 22. The advantage of the embodiment of FIG. 8 is that the number of characters which may be printed is increased further.

The reflectors 22 and 31 function in the same manner as the reflector 21. The shafts 23 and 26 are parallel to each other and perpendicular to the shaft 2. The three shafts 2, 23 and 26 may be positioned either coplanarly or in arbitrarily selected parallel planes and the reflectors 22 and 31 may be either movably or stationarily positioned in an arbitrary manner.

As hereinbefore described, the lens system of the present invention for photographic printing apparatus comprises a plurality of objective lenses and a single camera lens. Each of a selected character and its printed image is provided at a focal point of the lens system and said lens system is of simple structure, so that resolving power in the printing process is high and printing of high quality is provided. Furthermore, since movable parts are minimized or completely eliminated, there is no need for complex or complicated mechanisms and the speed of operation as well as the quality of printing are considerably increased. The distance between a character on the character sheet and its printed image may be freely determined and the magnification factor of the printing process may be modified arbitrarily. Furthermore, additional drums may be readily and facilely provided and the apparatus operates at a constant speed for all characters so that high-speed operation is provided.

Although drums have been described and illustrated as the rotatable components of the present invention, such drums may be readily replaced by discs.

Figure 9:
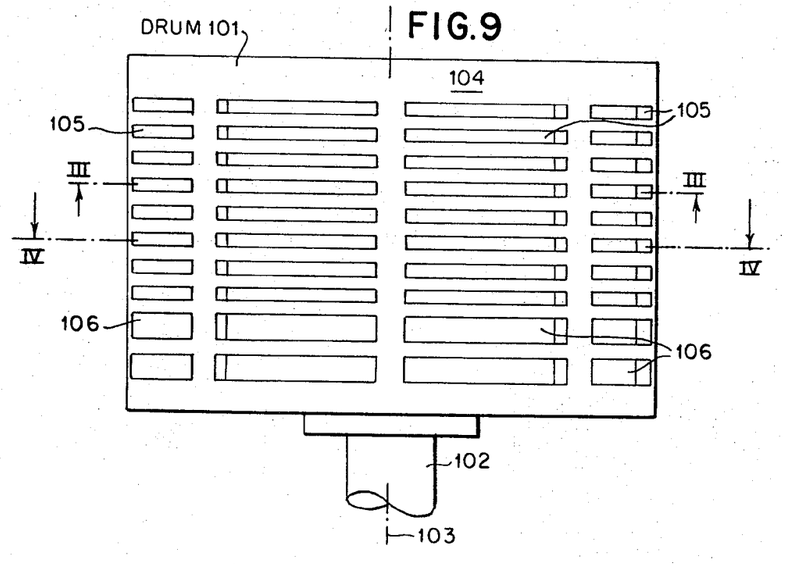
FIG. 9 is a side view of an embodiment of the drum of the photographic printing apparatus of the present invention.

In FIG. 9, a drum 101 is rotatably mounted on a shaft 102 for rotation about the axis 103 of said shaft. The drum 101 has a cylindrical surface 104 which has a plurality of windows 105 and 106 formed therethrough in mutually spaced relation. The windows 105 and 106 are elongated in directions transverse to the axis 103 of the drum 101.

The windows 105 and 106 are of substantially rectangular configuration and are formed by dividing the circumference or cylindrical surface of the drum 101 into spaced rectangular areas similar to a matrix or grid. The dimensions of the windows 105 and 106 are determined by the size of the characters or of the codes recorded on the character sheet 108.

Figure 10:
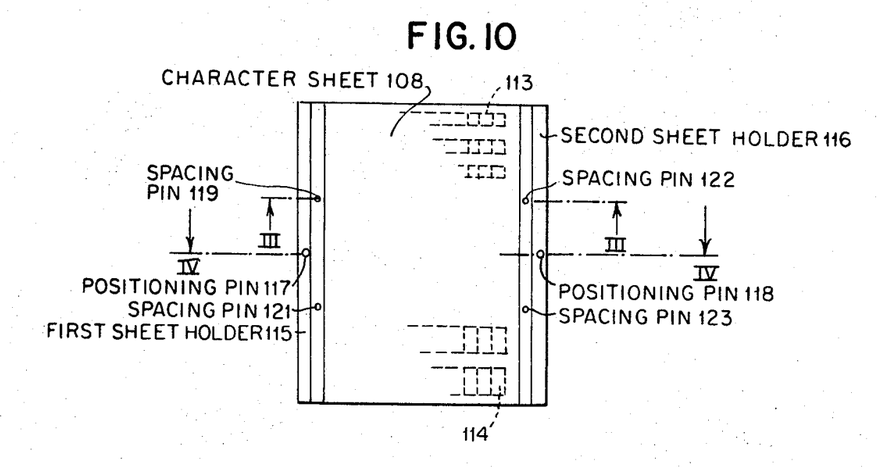
FIG. 10 is a top view of an embodiment of the character sheet of the photographic printing apparatus of the present invention.

The character sheet 108 is shown in FIG. 10. The character sheet 108 comprises a photographic negative or negative film. Characters or codes 113 and 114 are recorded on the character sheet 108 by photographic methods. Each line of characters or codes 113 and 114 corresponds to the pattern of windows 105 and 106 of the drum 101, as shown in FIG. 9.

Figures 12, 13, 15:
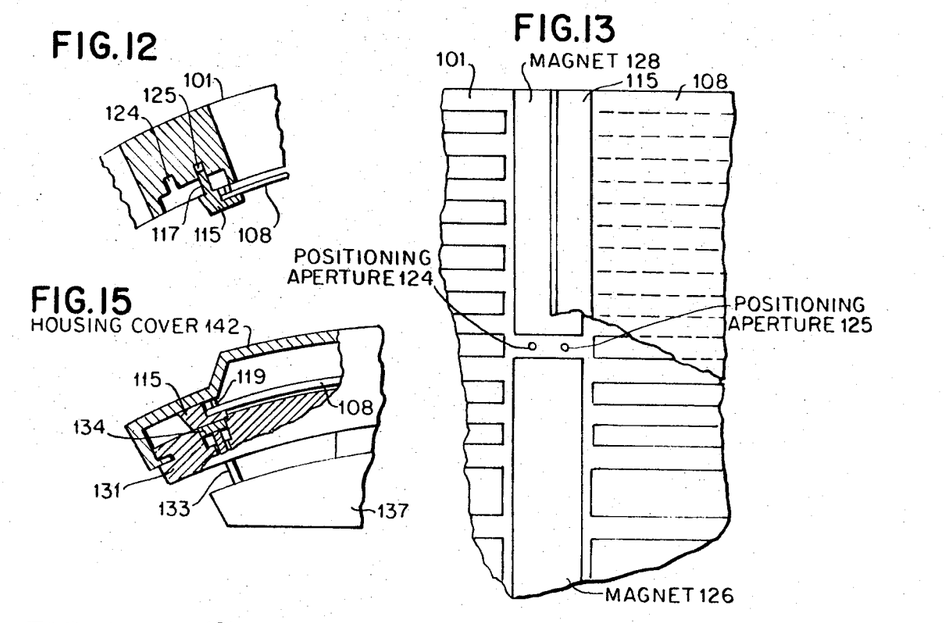
FIG. 12 is part of a view taken along the lines IV—IV of FIGS. 9 and 10.
FIG. 13 is a segmental view of the inside of the cylindrical surface of an embodiment of the drum of the photographic printing apparatus of the present invention.
FIG. 15 is a view, partly in section, of part of an embodiment of the character sheet of the photographic printing apparatus of the present invention and part of an embodiment of the housing for the character sheet.

A first sheet holder 115 holds the character sheet 108 along one edge of said sheet and a second sheet holder 116 holds said character sheet along the opposite edge of said sheet. The first and second sheet holders 115 and 116 comprise magnetic material such as, for example, iron. The first sheet holder 115 includes a positioning pin 117 extending therefrom and the second sheet holder 116 includes a positioning pin 118 extending therefrom (FIGS. 10 and 12).

A plurality of spacing pins 119 and 121 extend from the first sheet holder 115 (FIGS. 10, 11, 12, 14 and 15). The spacing pins 119 and 121 are spaced from each other and function to space the first sheet holder 115 a determined radial distance from the inside of the cylindrical surface 104 of the drum 101 when said character sheet is mounted on said drum. Each of the spacing pins 119 and 121 passes through a corresponding hole formed through the character sheet 108, so that said character sheet is radially movable toward the inside surface of the cylindrical surface 104 of the drum 101.

Figure 11:
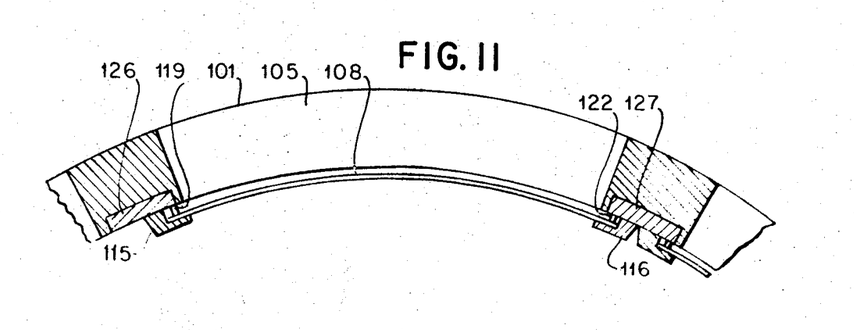
FIG. 11 is a part of a view taken along the lines III—III of FIGS. 9 and 10.
Figure 14:
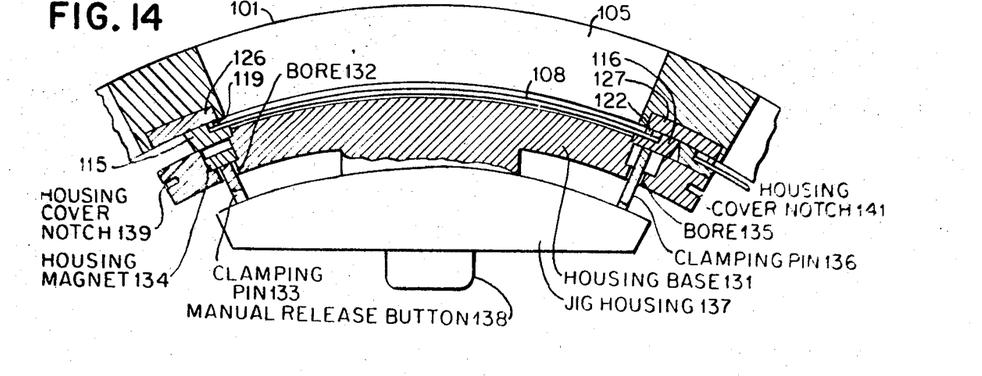
FIG. 14 is a view, partly in section, illustrating the mounting of the character sheet of the photographic printing apparatus of the present invention.

A plurality of spacing pins 122 and 123 extend from the second sheet holder 116 (FIGS. 10, 11 and 14). The spacing pins 122 and 123 are spaced from each other and function to space the second sheet holder 116 a determined radial distance from the inside of the cylindrical surface 104 of the drum 101 when said character sheet is mounted on said drum. Each of the spacing pins 122 and 123 passes through a corresponding hole formed through the character sheet 108, so that said character sheet is radially movable toward the inside surface of the cylindrical surface 104 of the drum 101.

A plurality of positioning apertures 124 and 125 (FIGS. 12 and 13) are formed in the drum 101 at the inside of the cylindrical surface 104 of said drum. The positioning pin 117 of the first sheet holder 115 of a character sheet 108 (FIGS. 10 and 12) is adapted to seat in the corresponding aperture 125 (FIG. 12). The positioning pin 118 of the second sheet holder 116 of the next adjacent character sheet 108 is adapted to seat in the corresponding positioning aperture 124 (FIG. 12).

FIG. 11 illustrates a character sheet 108 mounted on the drum 101.

A plurality of magnets 126, 127, 128, and so on (FIGS. 11, 13 and 14) are mounted on the inside of the cylindrical surface 104 of the drum 101 in areas corresponding to the positions of the sheet holders 115 and 116. Each of the magnets 126, 127, 128, etc., is a permanent magnet and is inserted in a groove or depression formed in the inside of the cylindrical surface 104 of the drum 101. The depressions, and therefore the magnets in them are elongated in axial directions of the drum 101, as shown in FIG. 13. The magnets 126, 127, 128, etc., are spaced from the positioning apertures 124 and 125 (FIG. 13).

The first and second sheet holders 115 and 116 are attracted by the magnets and provide a magnetic coupling of said sheet holders and said magnets, thereby removably mounting the character sheet 108 on the inside of the cylindrical surface 104 of the drum 101, as shown in FIG. 11. The configuration of the sheet holders 115 and 116 and the spacing pins 119, 121, 122, 123 of said sheet holders maintain a determined space between said sheet holders and the inside of the cylindrical surface of the drum 101. Thus, when the character sheet 108 is mounted on the drum 101 in accordance with the present invention, said character sheet is radially movable along the spacing pins 119, 121, 122, 123 as guides.

The possible radial movement of the character sheet is slight and is permitted to provide uniform movement of the character sheet 108 and uniform adherence of said character sheet to the inside of the cylindrical surface 104 of the drum under centrifugal force when said drum is rotated. The spacing pins 119, 121, 122, 123 also prevent the character sheet 108 from coming off the sheet holders 115 and 116 when said character sheet is removed from the drum.

When the character sheet 108 is to be mounted on the drum 101, the positioning pin 117 is first seated or inserted in its corresponding positioning aperture 125 and the positioning pin 118 is seated or inserted in its corresponding positioning aperture.

FIG. 14 illustrates a method of mounting the character sheet 108 on the inside of the cylindrical surface 104 of the drum 101. A housing base 131 supports the character sheet 108 when said sheet is separated from the drum 101 and functions as a jig for mounting said sheet on and removing said sheet from said drum. One or more bores 132 are formed through the housing base 131 on one side thereof. A clamping pin 133 is slidably mounted in each of the bores 132 for movement in directions of the axis of its bore.

A permanent housing magnet 134 is affixed to the outer end of each of selected ones of the clamping pins 133 and is positioned in alignment with the first sheet holder 115 of the character sheet 108. The remaining clamping pins 133 function as spacers. The magnetomotive force of the housing magnet 134 is greater than, and provides a greater magnetic attraction for, the first sheet holder 115, than the magnetomotive force and magnetic attraction of the magnets 126, 127, 128 of the drum 101.

One or more bores 135 are formed through the housing base 131 on the other side thereof. A clamping pin 136 is slidably mounted in each of the bores 135 for movement in directions of the axis of its bore. A permanent housing magnet is affixed to the outer end of each of selected ones of the clamping pins 136 and is positioned in alignment with the second sheet holder 116 of the character sheet 108. The remaining clamping pins 136, one of which is shown in FIG. 14, function as spacers. The magnetomotive force of each of the housing magnets is greater than, and provides a greater magnetic attraction for, the second sheet holder 116, than the magnetomotive force and magnetic attraction of the magnets 126, 127, 128 of the drum 101.

When the housing base 131 is separated from the drum 101, the housing magnet or magnets 134 etc., are positioned at the outer surface of said housing base, as shown in FIG. 15, by suitable clamping pin positioning means in a jig housing 137. The housing magnets 134 etc., attract and hold the first sheet holder 115 as shown in FIG. 15 and the other housing magnets holder 115 as shown in FIG. 15 and the other housing magnets attract and hold the second sheet holder 116, and thereby retain and support the character sheet 108. When the character sheet 108 is to be mounted on the drum 101, the housing base 131 is positioned so that the character sheet 108 retained thereby is properly positioned with the first sheet holder 115 in abutment with the magnet 126 and the second sheet holder 116 in abutment with the magnet 127. The clamping pin positioning means in the jig housing 137 is then operated via a manual release button 138 to draw the clamping pins 133 and 136 toward said jig housing. The housing base 131 is then removed from the drum 101 and the character sheet 108 remains mounted on the drum 101 due to the magnetic attraction of the magnets 126, etc., and the sheet holders.

A housing cover slot or notch 139 is formed in one side of the housing base 131 and a housing cover slot or notch 141 is formed in the opposite side of said housing base (FIG. 14). The housing cover notches 139 and 141 accommodate a housing cover 142, as shown in FIG. 15. The housing cover 142 retains the character sheet 108 in the housing comprising the housing base 131 and said housing cover and said housing protects said character sheet from damage, dust and foreign material.

The housing cover 142 is removed from the housing base 131 prior to mounting of the character sheet 108 on the drum 101. The character sheet 108 retained by the housing base 131 is then positioned on the inside of the cylindrical surface of the drum 101 in the aforedescribed manner. The positioning pins 117 and 118 of the first and second sheet holders 115 and 116 are positioned in their corresponding positioning apertures to insure proper alignment of said first and second sheet holders with the corresponding magnets 126, 127, 128, etc., of the drum 101. The manual release button 138 is then depressed, as hereinbefore described, upon abutment of the first and second sheet holders 115 and 116 with their corresponding drum magnets 126, 127, 128, etc.

The character sheet 108 may be removed from the drum 101 by positioning the housing base 131 on the character sheet 108 with the housing magnets 134, etc., in abutment with the first and second sheet holders, due to extension of the clamping pins 133 and 136 in directions away from the jig housing 137. The greater magnetic attraction of the housing magnets causes said housing magnets to hold the character sheet 108 and permits separation of said character sheet from the drum magnets 126, 127, 128, etc., when the housing base 131 is withdrawn from the drum. The character sheet 108 is retained on the housing base 131 by the housing magnets 134, etc. The housing cover 142 is then affixed to the housing base 131 by insertion into the housing cover notches 139 and 141.

It is thus seen that the photographic printing apparatus of the present invention and the character sheet mounting for such apparatus prevent distortion of the image by preventing a shift in focus due to bending of the character sheet by centrifugal force. This is accomplished by the provision of windows in the drum and by the provision of a suitable radial distance between the mounted character sheet and the inside of the cylindrical surface of the drum, which distance may be freely traversed by said character sheet when said character sheet is subjected to centrifugal force. Since the character sheet moves freely when it is subjected to centrifugal force, said character sheet is not affected by distortion of the mounting arrangement or sheet holders, and the entire surface of said character sheet may move into contact with the inside of the cylindrical surface of the drum under centrifugal force. This insures uniform focus for each character on the character sheet.

Since the character sheet is mounted on the inside of the cylindrical surface of the drum by magnetic attraction, the mounting arrangement is of simple structure and said character sheet may be mounted and removed with facility, rapidity and effectiveness. The mounting arrangement prevents sliding or slippage of the character sheet on the drum, even when the magnetic attraction is weak or centrifugal force is strong.

While the invention has been described by means of a specific example and in a specific embodiment, we do not wish to be limited thereto, for obvious modifications will occur to those skilled in the art without departing from the spirit and scope of the invention.

We claim:
1. In photographic printing apparatus including photosensitive means, a source of light and a character sheet interposed between said source of light and said photosensitive means and irradiated by said source of light for printing characters from said character sheet on said photosensitive means, a continuous rotary drum having a cylindrical surface interposed between said source of light and said photosensitive means, said cylindrical surface having a plurality of windows formed therethrough in mutually spaced relation, said drum having a plurality of positioning apertures formed therein at the inside of the cylindrical surface of said drum; mounting means for removably mounting a character sheet on the inside of the cylindrical surface of said drum over selected ones of said windows, said mounting means comprising a first sheet holder holding said character sheet along one edge of said sheet, a second sheet holder holding said character sheet along the opposite edge of said sheet, each of said sheet holders comprising magnetic material, and magnets mounted on the inside of the cylindrical surface of said drum in areas corresponding to the positions of said sheet holders, each of the first and second sheet holders of said mounting means including a positioning pin extending therefrom and adapted to seat in a corresponding one of said positioning apertures; and a lens system interposed between said character sheet and said photosensitive means for directing images of selected ones of the characters on said character sheet to said photosensitive means, said lens system comprising a plurality of objective lenses each having an optical axis parallel to that of the others and substantially perpendicular to said character sheet and a focal point on said character sheet, and a camera lens interposed between said objective lenses and said photosensitive means and of sufficient dimensions to intercept all parallel light quanta transmitted by said objective lenses, said camera lens having an optical axis parallel to the optical axes of said objective lenses and a focal point on said photosensitive means so that said camera lens provides on said photosensitive means an image of a selected one of said characters.

2. In photographic printing apparatus as claimed in claim 1, wherein each of the first and second sheet holders of said mounting means includes a plurality of spacing pins extending therefrom and adapted to space said sheet holders a determined radial distance from the inside of the cylindrical surface of said drum to permit radial movement of said character sheet when said character sheet is mounted on said drum.

3. In photographic printing apparatus including photosensitive means, a source of light and a character sheet interposed between said source of light and said photosensitive means and irradiated by said source of light for printing characters from said character sheet on said photosensitive means, a continuous rotary drum having a cylindrical surface interposed between said source of light and said photosensitive means, said cylindrical surface having a plurality of windows formed therethrough in mutually spaced relation; mounting means for removably mounting a character sheet on the inside of the cylindrical surface of said drum over selected ones of said windows, said mounting means comprising a first sheet holder holding said character sheet along one edge of said sheet, a second sheet holder holding said character sheet along the opposite edge of said sheet, each of said sheet holders comprising magnetic material, and magnets mounted on the inside of the cylindrical surface of said drum in areas corresponding to the positions of said sheet holders, each of the first and second sheet holders of said mounting means including a plurality of spacing pins extending therefrom and adapted to space said sheet holders a determined radial distance from the inside of the cylindrical surface of said drum to permit radial movement of said character sheet when said character sheet is mounted on said drum; and a lens system interposed between said character sheet and said photosensitive means for directing images of selected ones of the characters on said character sheet to said photosensitive means, said lens system comprising a plurality of objective lenses each having an optical axis parallel to that of the others and substantially perpendicular to said character sheet and a focal point on said character sheet, and a camera lens interposed between said objective lenses and said photosensitive means and of sufficient dimensions to intercept all parallel light quanta transmitted by said objective lenses, said camera lens having an optical axis parallel to the optical axes of said objective lenses and a focal point on said photosensitive means so that said camera lens provides on said photosensitive means an image of a selected one of said characters.

* * * * *